No. 782,913. PATENTED FEB. 21, 1905.
J. O. KING.
TIRE CASING.
APPLICATION FILED FEB. 23, 1904.
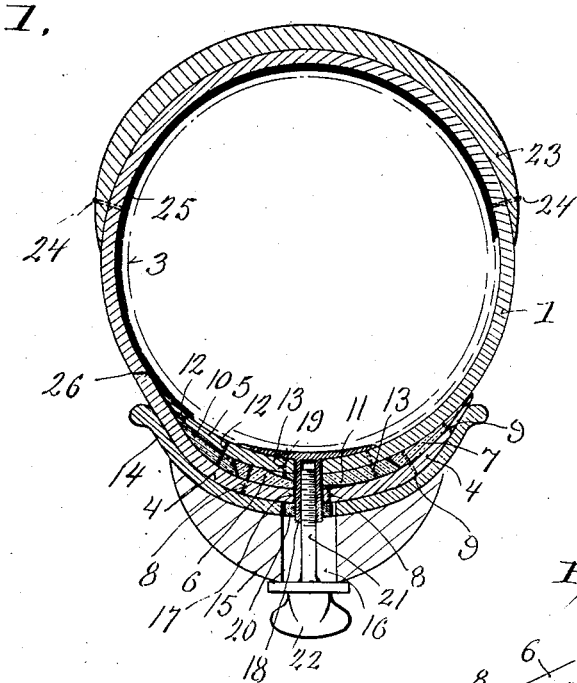
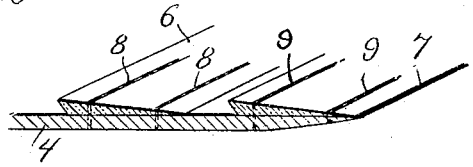
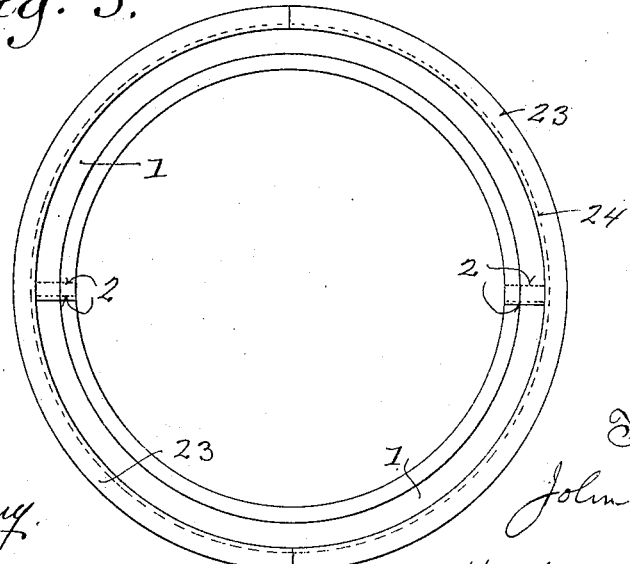
Witnesses
Geo. W. Young
R. J. Barsch
Inventor:
John O. King
By H. G. Underwood
Attorneys No. 782,913.

Patented February 21, 1905.

UNITED STATES PATENT OFFICE.

JOHN O. KING, OF RACINE, WISCONSIN, ASSIGNOR OF ONE-HALF TO THOMAS M. KEARNEY, WILLIAM D. THOMPSON, AND PETER J. MYERS, OF RACINE, WISCONSIN.

TIRE-CASING.

SPECIFICATION forming part of Letters Patent No. 782,913, dated February 21, 1905.

Application filed February 23, 1904. Serial No. 194,805.

*To all whom it may concern:*

Be it known that I, JOHN O. KING, a citizen of the United States, and a resident of Racine, in the county of Racine and State of Wisconsin, have invented certain new and useful Improvements in Tire-Casings; and I do hereby declare that the following is a full, clear, and exact description thereof.

My invention has especial reference to a casing for pneumatic tires or tubes, and is adapted to be secured to the rim of an automobile or other vehicle wheel; and it consists in certain peculiarities of construction and combination of parts, as will be fully set forth hereinafter in connection with the accompanying drawings and subsequently claimed.

In the said drawings, Figure 1 is a vertical sectional view of a portion of my said tire-casing and the wheel-rim to which it is attached. Fig. 2 is a detail view of part of said casing. Fig. 3 is a view in side elevation of the entire tire-casing drawn to a greatly-reduced scale.

Referring by numerals to the drawings, 1 1 represent the sections of which my tire-casing is formed, two sections being here shown, but the exact number being immaterial. These sections are made of any suitable flexible leather, the meeting edges of the two sections being preferably skived and secured by lines of stitching 2 2. The inner annular edges of the casing are not united, but left open for the reception of the pneumatic tire or tube, (indicated by the dotted circle 3 in Fig. 1,) and said edges (marked 4 and 5, respectively) lap past each other in use and are held together as follows: The edge 4 of the casing 1 has secured to its inner surface parallel annular strips of leather, (marked 6 7,) each triangular in cross-section and tapering, so that the butt edge of each strip is obliquely undercut, while the face tapers forwardly to a pointed edge. These strips are secured to the casing by lines of stitching 8 8 and 9 9 and extend all around the casing, either continuously or in successive connecting-pieces. The opposed edge 5 of the casing is correspondingly provided, but on its outer surface, with complementary parallel annular strips 10 11, held to the casing by lines of stitching 12 12 and 13 13. These strips 10 and 11 are also oblique or tapered, but just the opposite from the strips 6 and 7, so that when the casing edges 4 and 5 are pushed past each other the oblique forward butt edges of the strips 10 and 11 will slip to place against and under the undercut rear butt edges of the said strips 6 and 7 and form a lock in the manner clearly shown in Fig. 1.

The wheel-rim (shown in Fig. 1) is formed with a metal trough 14 and wood backing 15, having transverse bores 16 through both at certain intervals, and in line therewith are bores 17 of lesser diameter extending through the interlocked casing edges 4 5, through which latter bores are slipped hollow screw-bolts 18, formed with both exterior and interior screw-threads and with a wide curved head 19, and when the said bolts are in place (with the tube 3 within the casing) a nut 20 is slipped on each bolt 18, thus clamping the interlocked edges of the casing between said nut and the said bolt-head 19. Now in order to hold the casing to the rim the threaded shank 21 of a thumb-screw is inserted through the bore 16 of the rim and into the hollow bolt 18 and turned till the head 22 of said thumb-screw is against the rim-back 15, and this being done all around the rim the casing is held very tightly thereto. The tread of this casing is preferably made of a strip or successive strips of sole-leather 23, extending all around the tire-casing and secured in any suitable manner thereto, preferably by lines of stitching 24 24, as thus it will be firmly held to place without interfering with the resiliency of the tire-casing and will be practically puncture-proof and at the same time readily removable by cutting the lines of stitching, if this becomes necessary for any cause.

If desired, the casing may be lined with any suitable fabric secured by rubber cement to the inner surface of said casing, as indicated at 25, the said lining having its annular line of separation at the point 26, one annular edge of the said lining being secured to the edge 5 of the casing and the other lining edge meeting at this point the first-named edge, the bolt-head 19 being thus covered by the lining. The casing may be waterproofed, if desired, and will be found to be a very efficient and durable protector to the inflated pneumatic tube within, and while I prefer the construction illustrated, with two of the parallel locking-strips attached to each annular edge of the casing, my device will hold the said edges of the casing securely together with only one annular locking-strip to each edge. It will be further noted that while I prefer to make my tire-casing of leather, as described, the overlapping annular edges, which are provided with opposing annular interlocking strips, would operate and lock in the manner set forth when made of other flexible material, and such therefore may be used, if desired, in any particular instance.

Having thus described my invention, what I claim as new, and desire to secure by Letters Patent, is—

1. A tire-casing comprising sections of flexible leather stitched together to form a continuous annular tube circumferentially open for the reception of a pneumatic tube, and the annular edges being provided with series of straight bevel-faced opposing annular strips, which interlock as the said edges are forced past each other.

2. A tire-casing comprising sections of flexible leather, stitched together to form a continuous annular open tube, the overlapping annular edges of which are provided with interlocking annular strips, in combination with headed hollow screw-bolts and nuts for clamping the locked edges together.

3. A tire-casing comprising a continuous annular open tube of flexible material, the overlapping annular edges of which are provided with opposing annular interlocking strips, arranged in series, and secured to said tube by lines of stitching, each of said strips having one flat surface, and an opposed straight beveled surface, and undercut at its butt edge.

In testimony that I claim the foregoing I have hereunto set my hand, at the city of Racine, in the county of Racine and State of Wisconsin, in the presence of two witnesses.

JOHN O. KING.

Witnesses:
JOHN H. LIEGLER,
NORA E. KEARNEY.